United States Patent [19]

Williamson, III et al.

[11] 4,414,303

[45] Nov. 8, 1983

[54] CADMIUM NEGATIVE ELECTRODE

[75] Inventors: Thomas R. Williamson, III, Sunrise; Beth B. Jones, Coral Springs; Harold Field, Plantation, all of Fla.; Robert F. Stephenson, El Toro, Calif.

[73] Assignee: Motorola, Inc., Schaumburg, Ill.

[21] Appl. No.: 362,376

[22] Filed: Mar. 26, 1982

Related U.S. Application Data

[63] Continuation-in-part of Ser. No. 182,156, Aug. 28, 1980, abandoned.

[51] Int. Cl.³ ................... H01M 4/24; H01M 4/02
[52] U.S. Cl. ............................... 429/217; 429/222; 252/182.1; 29/623.1
[58] Field of Search ............... 429/222, 217, 232; 252/182.1; 204/291, 280; 29/623.1

[56] References Cited

U.S. PATENT DOCUMENTS

| | | | |
|---|---|---|---|
| 2,366,402 | 1/1945 | Hanel | 429/222 |
| 2,727,080 | 12/1955 | Moulton | 429/222 X |
| 2,820,077 | 1/1958 | Salanze | 429/222 X |
| 3,847,784 | 11/1974 | Przybyla | 429/222 X |
| 3,870,562 | 3/1975 | Cathenino | 429/222 X |
| 3,877,986 | 4/1975 | Cathenino | 429/222 X |
| 3,888,695 | 6/1975 | Cathenino | 429/222 X |

*Primary Examiner*—Anthony Skapars
*Attorney, Agent, or Firm*—Joseph T. Downey; Mark P. Kahler; Edward M. Roney

[57] ABSTRACT

The invention comprises an improved cadmium negative electrode which is less prone to fading, can easily be manufactured by a pasting technique, and which does not require any external cycling to develop a precharge. This is accomplished by the use of irregular knarled cylindroidal cadmium particles of an average size ranging from 8 to 25 microns as measured by a Fisher Subsieve Sizer. The irregular knarled cylindroidal shape of the particles provides a substantial improvement pyrophoric characteristics while stilll providing electrochemical activity within a nickel-cadmium cell.

6 Claims, 3 Drawing Figures

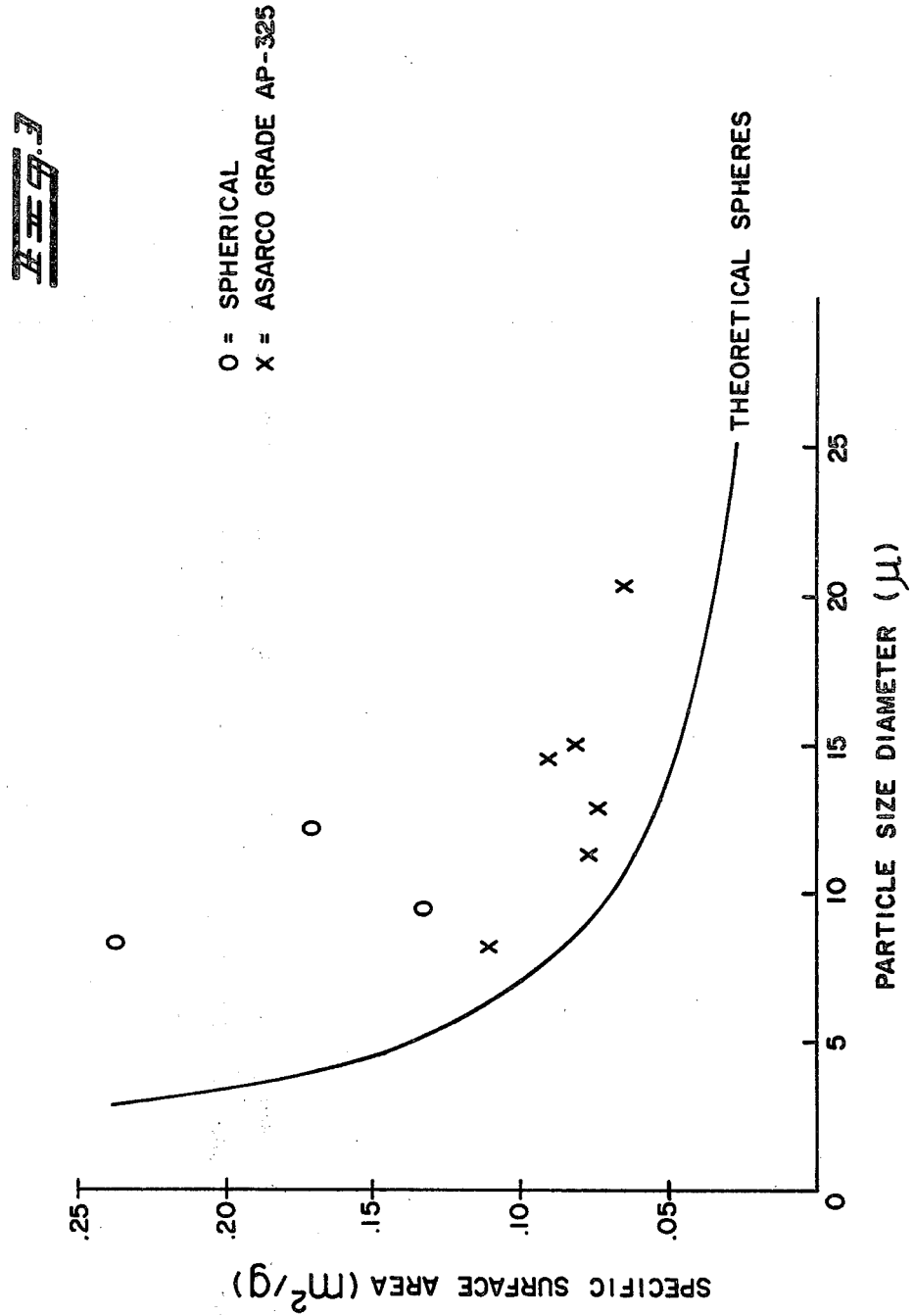

CADMIUM NEGATIVE ELECTRODE

CROSS REFERENCE TO RELATED APPLICATIONS

This application is a continuation in part of co-pending application U.S. Ser. No. 182,156, filed Aug. 28, 1980, entitled "A Cadmium Negative Electrode" having the same inventors and assignee and now abandoned.

FIELD OF INVENTION

This invention relates to an improved cadmuim negative electrode and a method of making such a cadmium negative electrode from suitable particulate material for use in a rechargeable electrochemical cell.

BACKGROUND OF THE INVENTION

The typical method of manufacture of cadmium electrodes for rechargeable cells is by impregnation of a sintered nickel plaque with an aqueous cadmium salt solution. This solution may contain various additives to facilitate the introduction of the cadmium salts into the plaque. Other components necessary for the later conversion of the cadmium salts to cadmium hydroxide in accordance with the particular process used are also included. The sintered nickel plaque does not constitute an active electrode, but merely provides a current carrier and support matrix for the active material, cadmium hydroxide.

Alternately, cadmium hydroxide may be applied as a paste to a current-carrying substrate of suitable material. Such a paste may begin as cadmium hydroxide or as cadmium oxide which later gains water to become cadmium hydroxide. It is customary in such paste systems to include metallic cadmium and/or nickel particles in order to provide a conductive matrix. While analogies with wet primary cells are frequently drawn, it should be noted that there are several major differences, including the fact that the cadmium electrode must function in a different electrochemical manner during the charge and discharge portions of its cycle. For such rechargeable cells the cadmium hydroxide itself constitutes one electrode, the free hydroxyl ions form the electrolyte and active nickel hydroxide forms the second electrode. The physical substrates in such cells are merely current conductors to establish external contacts for the active elctrochemical materials.

Subsequent to the manufacture of impregnated or pasted cadmium hydroxide electrodes it is normally necessary to execute a repeated chargedischarge or formation cycle in a suitable electrolyte, such as aqueous sodium hydroxide solution. The function of this formation cycle is to produce cadmium metal particles or to convert those already included in the electrode to an electrochemically active form which provides a reserve of undischarged material. This formation cycle is carried out prior to assembly of the negative plates into rechargeable cells or prior to closing of the cells when carried out in situ wih a large excess of electrolyte.

It has been recognized as desirable to be able to assemble a cell in its final usable state without need of this formation cycle, thus allowing construction of a cell from uncharged positive and negative electrodes. In general, two parameters determine the efficiency of cadmium metal incorporated in a battery electrode for the purpose of providing electrochemical precharge as a means of eliminating the formation cycle. These are: (1) Total surface area, and (2) particle shape. In order to have electrochemical activity, a large surface is desired to provide sites for electrochemical reactions. In the case of metallic cadmium, this surface undergoes the discharge half-reaction:

$$Cd + 2OH^- \rightarrow Cd(OH)_2 + 2e^-$$

during normal battery use.

It is apparent from this reaction that the cadmium metal must be in contact with a sufficient number of hydroxyl ions. Thus, the total surface area is critical for the precharge. But in addition, the battery must function over some period of time which may include several recharge cycles. In order to establish sufficient activity within a cell over the period of its life, there must be a sufficient cadmium reserve to make up for the generation of occluded pockets of cadmium formed during the charge cycle, which may become isolated from electrolyte due to the starved (or low electrolyte) condition within the cell. By providing an electrochemical reserve of readily oxidizable cadmium material, a cell made from such a negative electrode matched with a suitable positive electrode will no longer exhibit a reduction in its capacity with successive charge-discharge cycles. This "fading" of the capacity is typical of cells which are lacking in readily oxidizable cadmium mass. It is believed that this "fading" phenomenom is caused by some of the cadmium material, produced from charging the active cadmium hydroxide, becoming occluded upon subsequent discharge, thereby resulting in inactivity. To maintain capacity through many cycles, a reserve from which active cadmium material may be drawn is provided.

In the past, cadmium metal particles have been produced in various shapes by differing methods. One method produces a finely divided "sponge-like" cadmium metal through electrolysis in conjunction with cadmium hydroxide which will, upon drying, produce a suitable mixture for manufacture of battery electrodes. However, the material so produced is not precharged for an electrode and there is no indication that the cadmium so produced has any electrochemical activity. The primary reasons for its use are to increase the bulk density of the electrode starting material and to provide an improved separation of the cadmium hydroxide particles so that the mixture is no longer sticky and may be easily poured.

Another method of making cadmium particles is described generally as acicular, but are more specifically dendritic, or tree-like, in structure. Acicular is defined as sharp, slender or needle shaped. It is known that the prior mentioned spongy cadmium made by electrolysis is unsatisfactory because it does not possess the necessary electrochemical activity for use in battery electrodes. The dendritic form of cadmium is made by the action of powdered aluminum or zinc on solutions of cadmium salts. This action produces the dendritic crystalline structures of the cadmium. While this form of cadmium is more electrochemically active than other processes the dendritic structure is considered undesirable in batteries due to its marked propensity for causing short circuits to the positive plate as a result of additional crystalline growth during the battery cycle life.

One danger that is inherent in the use of small active particles is their pyrophoricity. The pyrophoricity or flammability of the powderized form of a given metal or material will vary with the process used to produce it. This is due to the surface area per unit weight ratio known as specific surface area of the material or the chemical reactivity of the material itself either of which may vary. High specific surface area makes a material more readily pyrophoric.

The desired cadmium metal structure for electrodes will have a high total surface for electrochemical activity, but a low specific surface area to reduce the pyrophoricity. It is known that precharge activity can be produced by spherical particles in the specific size range of 3 to 12 microns made by a process of condensation from metallic cadmium vapors. These were considered to be small enough (large total surface area) to be electrochemically active, but large enough (lower specific surface area) not to be pyrophoric. However, it was found that beyond 12 microns, the cadmium particles have markedly diminished electrochemical activity and are not usable.

Furthermore, it is well known that, the ignition temperature of a given particle size can be raised by a slight amount of oxidation; with the effect being most marked for the finer powders. Thus, some oxidation can reduce the tendency for pyrophoricity. While the prior spherical powder is purported to be relatively safe, it is still necessary to take many precautions. What is missing is a pyrophorically safe, yet electrochemically active cadium material for use as a negative electrode.

SUMMARY OF THE INVENTION

An object of this invention is to produce an improved eltrochemical rechargeable cell by means of a cadmium negative electrode manufactured in the uncharged state, containing an electrochemical reserve of cadmium precharge formed from pyrophorically improved material.

It is another object of this invention that the electrode shall be manufactured using a metal cadmium powder having particles of a sufficient shape and size for safe handling while retaining sufficient total surface area to provide the requisite electrochemical activity.

The process proposed uses unique particle configurations made by a condensation from metallic cadmium vapors and containing a stabilizing oxide layer. These particles are intentionally nonspherical having irregular, gnarled cylindroid or sausage-like appearances. For a similar size range, these particles of unique structure when measured by the Fisher Subsieve Sizer technique yield a higher specific surface area as measured by the Quanta-Sorb surface area analyzer than that which would be obtained for theoretical spheres. Experience in the art teaches that spherical particles should be used to minimize specific surface area. But such theoreticl spheres must, as taught in the prior art, have a particle size range which encompasses much smaller sizes for sufficient activity. However, the unique particle configuration of the present invention has a particle size range which encompasses a larger size, thereby improving the specific surface area for over theoretical spheres of smaller size. The increased quantity of reactive material, which is nearer the surface as a result of the unique particle shape, leads to substantially increased electrochemical activity while allowing particles of a larger size and lower specific surface area to be used, thereby maintaining electrochemical activity while considerably enhancing the stability against pyrophoricity.

DETAILED DESCRIPTION OF THE DRAWINGS

FIG. 3 is a graph of specific surface area versus measured particle size with a solid line showing the curve for theoretical spheres.

DESCRIPTION OF THE INVENTION

Figure 1:
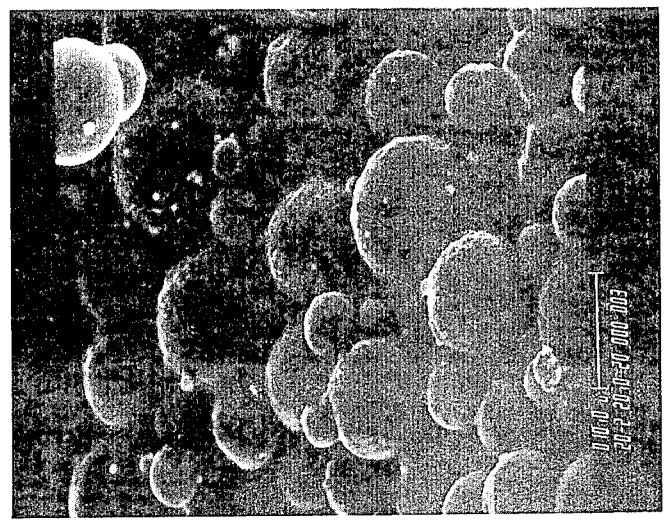
FIG. 1 is a photomicrograph showing spherical shaped cadmium metal particles which were formed by vapor condensation.

FIG. 1 is a scanning electron micrograph of a spherical cadmium metal particles made by a vapor condensation process. As may be seen from the photomicrograph, the formed particles are generally spherical in shape. Some distortion is shown and is due primarily to the photomicrograhic technique. Although, not immediately obvious from the photograph, the particle size range is from 3 to 12 microns, as measured using the well-known Fisher Subsieve Sizer technique. The inclusion of FIG. 1 is to show the particulate form of a cadmium metal as is known in the prior art.

Ideally, for electrochemical activity, the highest total surface area is provided by spherical particles of infinitely small diameters and would be the most reactive structure possible for cadmium. But, most metals become increasingly pyrophoric as their size decreases, due in particular to an increase in their specific surface area and the corresponding tendency for increased reaction with the oxygen in the atmosphere. Thus the exchange seems to be one of utilizing small particle size which is active, but dangerous or larger particle size which is safe, but inactive. Unfortunately, cadmium particles of large size have been found not to have the requisite total surface area to promote a readily oxidizable surface. Thus, although they are safe due to the low specific surface area, they are not electrochemically active.

In the past it seemed clear that the most desired form of cadmium would be spherical particles since they provide the lowest specific surface area of any three-dimensional structure, thus enhancing resistance to pyrophoricity. The specific surface area is normally defined as the total surface area of particular material in one gram mass of the material. The particle size would then be as small as possible to promote a high total surface area and, thus, ensure that there is not a bulk amount of cadmium inaccessible from the reaction zone at the surface.

Although spherical particles seemed to be appropriate for providing the requisite activity, it is clear that for spherical particles, as theparticle size increases the activity decreases. This is a direct result of the effect of the shape of the particle. For spherical particles, as diameter increases, this isolates more and more material at ever increasing distances from the outer surface, and thus, from the reaction zone. It is believed that not merely the particle size, but rather size in combination with the particle configuraion or shape is the determinative factor in activity.

Figure 2:
FIG. 2 is a photomicrograph showing the irregular gnarled cylindroid or sausage shaped cadmium metal particles of the present invention which were formed by vapor condensation.

By contrast, FIG. 2 shows photomicrograph of the irregular gnarled cylindroidal or sausageshaped particles of cadmium metal formed by a vapor deposition process. These are the uniquely configured particles of the present invention. By contrast to the particles shown in FIG. 1, the general cylindroidal or sausage shape has several advantages when it comes to total activity as required by cadmium metal in an electrode. Chemically reacting particles may be described as having a reaction thickness, that is, the proportion of material in which is sufficiently accessable so that an electrochemical reaction might occur. For the particles of the present invention, because of their general cylindrical shape, it may be seen that the principal circular cylindroidal dimension is such that a substantially greater amount of cadmium material is within an accessible distance from the surface for a given size particle than would be possible for corresponding sized spherical particles. The cross section diameter of the sausage is such that the reaction distance forms a shell which, in this case, is also cylindroidal in nature, and constitutes a more efficient presentation of a proportion cadmium metal for the reaction zone than would be possible in the equivalent spherical particle. Spherical particles present only a spherical shell while shielding a substantial quantity of material from the reaction zone. Cylinders are not as effective in shielding material from the reaction zone. Thus, due to the shape of the present particles, more cadmium is available for reactivity.

Although several configurations of cadmium particles may be appropriate as having the desired shape to present an increased total activity, the cadmium particles in a preferred embodiment is obtainable from Asarco and designated as cadmium grade AP-325.

FIG. 3 shows a plot of the specific surface area in meters squared/gram versus particle size diameter in microns as measured using the Fisher Subsieve Sizer technique. Shown in a solid line is the appropriate curve for a theoretical spheres. Whenever the term particle size is used, what is meant is a measurement using the Fisher Subsieve Sizer technique with the only exception being for theoretical spheres for which the ideal spherical dimensions are used as particle size. It may be seen with reference to this solid line that if the prior art particles consist ideally of theoretical spheres, then in the prior art range of 3 to 12 microns, the specific surface area within this region is relatively high. A reasonable average value would exceed .10 meter sq./gram. The three O's shown on the graph represent measurements of randomly selected samples of prior art spherical particles. While only three such samples were measured, in all samples, the Fisher Subsieve Sizer technique resulted in a measurement which was considerably larger than theoretical spheres.

The several X's on the graph represent actual measurements for Asarco grade AP-325 cadmium metal powder of a cylindroidal shape. While no attempt is made to connect the individual data points, it may be seen that there is a tendency for this material to maintain a nearly constant specific surface area, while extending out at least to and beyond 20 microns in diameter. Indeed, the preferred range for its utilization is from 8 to 25 microns measured using the Fisher Subsieve technique. Moreover, comparison of the specific surface area for the actual spherical cadmium particle versus the irregular cylindroidal or sausage particles of the present invention show that the particles of the present invention have a considerably lower specific surface area over a common particle size range, viz, the preferred size range described in the prior art. This lower specific surface area means the particles are safer from the view point of pyrophoricity.

It will be recalled that the tendency to be pyrophoric for a given metal was directly proportional to its specific surface area. In this case, the irregularly shaped, but generally cylindroidal particles of the present invention provide a much lower specific surface area over a wide size range. This produces a far safer particulate form of cadmium metal, since the particle size itself affects the pyrophoricity. Thus, the particulate geometry for the present invention presents an inherently safer form of cadmium metal for use in cadmium negative electrodes.

The prior art has taught that particle sizes exceeding the range of 3 to 12 microns were not usable from the view point of total electrochemical activity. With the discovery and use of the irregular gnarled cylindroidal particles of cadmium metal, the present invention allows for a far safer form of cadmium metal from the view point of pyrophoricity to to be used while still showing sufficient electrochemical activity to provide all of the benefits of the cadmium precharge necessary to eliminate the formation cycle of the battery. Thus, contrary to the prior art which teaches that spherical particles with a specific range must be utilized the present invention allows for particles of a different shape to be utilized, thus lowering the tendency for pyrophoricity, yet maintaining the total electrochemical activity.

Thus, it may be seen that over two factors, the particle diameter as measured in the Fisher Subsieve Sizer measurements, and the specific surface area which is correspondingly related thereto, the unique configuraion of the particulate form of cadmium metal of the present invention is far safer from a pyrophoric point of view. Moreover, the shape of the particles provides the sufficient electrical activity to allow the cadmium metal to be used as a precharged negative electrode.

According to the present invention, the cadmium elctrode comprises a mixture of cadmium oxide and powdered cadmium metal and the mixture is applied using a binder to a metal current conducting foraminous substrate. The cadmium metal powder is prepared to have a general configuration shape which is described as irregular gnarled cylindroid or sausage-shaped. This is in contrast with the generally spherical cadmium metal powder. Cadmium metal on exposure to atmosphere oxygen readily oxidizes to form a surface layer of cadmium oxide.

This layer inhibits further oxidation and further stabilizes the cadmium powder. Other types of cadmium metal powder such as those prepared by grinding have been found not to exhibit the requisite electrochemical activity, and nickel-cadmium cells made from such material tend to lose their capacity and "fade" quite rapidly.

· According to one aspect of the present invention, the cadmium powder, having the requisite particulate shape cadmium oxide powder and nickel hydroxide power are mixed and the mixture is added to a dispersion of Teflon TM (Registered trademark of DuPont Corporation) binder in water. Such mixture is then applied to a substrate layer for carrying current.

In order to more fully understand the nature of this invention, several examples are provided:

EXAMPLE 1

A mixture of dry powders, comprising 10 grams of cadmium powder of the requisite particulate shape of sizes ranging from 8 to 25 microns, as measured by a Fisher Subsieve Sizer, 76 grams of cadmium oxide powder, 1.5 grams of nickel hydroxide powder and 0.5 grams of nickel powder, is added to 2.2 milliliters of a Teflon TM dispersion with sufficient excess of water to allow complete hydration of the cadmium oxide. This paste mixture is applied to a nickel, or nickel-plated steel, current carrier in the form of a perforated foil. After application, the paste is calendered and dried to form the electrode.

EXAMPLE 2

A mixture of 20 grams of cadmium powder of the requisite particulate shape of sizes ranging from 8 to 25 microns, 67 grams of cadmium oxide powder, 1.5 grams of nickel hydroxide powder and 0.5 grams of carbonyl nickel powder is added to 1 gram of Teflon TM as a dispersion diluted in deionized water. Such mixture is applied to an expanded metal grid of nickel which acts as a current distributor and conductor. Such electrodes are pressed to a desired thickness and dried prior to use.

EXAMPLE 3

A mixture of 30 grams of cadmium powder of the requisite particulate shape of sizes ranging from 8 to 25 microns, 56 grams of cadmium oxide powder and 2.0 grams of nickel hydroxide powder is added to a 60% stock of Teflon TM dispersion diluted to allow sufficient water to hydrate the cadmium oxide. This paste is calendered onto a woven nickel, or nickelplated steel, screen mesh and is subsequently dried. Such electrodes may then be incorporated directly into nickel-cadmium cells.

An improved cadmium negative electrode and inventive method of making a cadmium negative electrode, in accordance with the present invention, have been described. It will be appreciated that changes and modifications may be made without departing from the spirit and scope of the present invention.

We claim that:

1. An improved cadmium negative electrode comprising a substrate for carrying current, and a mass made of cadmium oxide mixed with cadmium metal powder, said cadmium metal powder having particles of irregular gnarled cylindroidal shape and average size of approximately 8 to 25 microns and wherein said mass is electrochemically active, bound into a flexible polymer-bonded mass and attached to said substrate.

2. The electrode of claim 1 wherein said irregular gnarled cylindroidal-shaped particles are produced by condensation of cadmium metal vapor.

3. The electrode of claim 2 wherein irregular gnarled cylindroidal-shaped particles further include a subsequently formed surface layer of cadmium oxide constituting approximately 6% of the mass.

4. An improved method for producing a cadmium negative electrode for a rechargeable cell having enhanced antifading properties comprising the steps of:

using generally irregular gnarled cylindroidal-shaped particles of cadmium metal powder having an average particle size of approximately 8 to 25 microns, stabilized with a layer of cadmium oxide to inhibit oxidation of the metal powder, mixing together said stabilized cadmium powder and cadmium oxide powder with a polymer binder into a mixture forming an electrochemically active cadmium metal mass, and applying the mixture to a substrate used for carrying current.

5. The method of claim 4 wherein said irregular gnarled cylindroidal-shaped particles are formed by a condensation of cadmium metal vapor.

6. The method of claim 5 wherein said irregular gnarled cylindroidal-shaped particles further include a subsequently formed surface layer of cadmium oxide constituting approximately 6% of the mass.

* * * * *